US008832420B2

(12) United States Patent
Kim et al.

(10) Patent No.: US 8,832,420 B2
(45) Date of Patent: Sep. 9, 2014

(54) COMPUTER SYSTEM AND BOOTING METHOD THEREOF

(75) Inventors: Kyung-young Kim, Suwon-si (KR); Jung-hwan Oh, Suwon-si (KR); Bum-keun Kim, Yongin-si (KR); Sang-chun Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 979 days.

(21) Appl. No.: 12/024,380

(22) Filed: Feb. 1, 2008

(65) Prior Publication Data

US 2009/0044002 A1 Feb. 12, 2009

(30) Foreign Application Priority Data

Aug. 6, 2007 (KR) .................................. 2007-78790

(51) Int. Cl.
*G06F 9/24* (2006.01)
*G06F 15/177* (2006.01)
*G06F 11/22* (2006.01)
*G06F 9/44* (2006.01)

(52) U.S. Cl.
CPC .......... *G06F 11/2284* (2013.01); *G06F 9/4401* (2013.01)
USPC .................... 713/1; 713/2; 713/100; 711/112

(58) Field of Classification Search
USPC ................................... 713/1, 2, 100; 711/112
See application file for complete search history.

(56) References Cited

U.S. PATENT DOCUMENTS

| | | | |
|---|---|---|---|
| 5,483,649 A * | 1/1996 | Kuznetsov et al. .............. 726/22 |
| 6,421,775 B1 * | 7/2002 | Brock et al. ....................... 713/1 |
| 6,594,723 B1 * | 7/2003 | Chapman et al. ............. 711/103 |
| 6,725,368 B1 | 4/2004 | Liebenow |
| 7,200,761 B1 * | 4/2007 | Freeman et al. ............... 713/184 |
| 7,743,243 B2 * | 6/2010 | Wang et al. ........................ 713/2 |
| 2003/0172261 A1 * | 9/2003 | Lee et al. ........................... 713/1 |
| 2004/0015629 A1 * | 1/2004 | Inui et al. ...................... 710/300 |
| 2005/0283599 A1 * | 12/2005 | Zimmerman et al. ............ 713/2 |
| 2006/0062046 A1 * | 3/2006 | Babudri et al. ........... 365/185.09 |
| 2006/0245274 A1 * | 11/2006 | Choi et al. ............... 365/189.12 |
| 2007/0174602 A1 | 7/2007 | Kao |

FOREIGN PATENT DOCUMENTS

| | | |
|---|---|---|
| KR | 2000-0008845 | 2/2000 |
| KR | 10-2001-0093216 A | 10/2001 |
| KR | 10-2003-0074106 A | 9/2003 |
| KR | 10-2007-0077463 A | 7/2007 |
| WO | 00/40005 A1 | 7/2000 |

OTHER PUBLICATIONS

Search Report issued by the European Patent Office in European Patent Application No. 08153681.1-1243 on Jun. 8, 2009.
Korean Decision of Rejection mailed on Sep. 27, 2012 for related Korean Application No. 10-2007-0078790.
European Office Action mailed Mar. 12, 2014.

* cited by examiner

*Primary Examiner* — Michael J Brown
(74) *Attorney, Agent, or Firm* — Jefferson IP Law, LLP

(57) ABSTRACT

A computer system, including a data storage unit which stores first operating system data of the computer system therein; a main memory to which the first operating system data is copied; a data transmission unit which transmits data between the data storage unit and the main memory; and a controller which performs a power-on self test (POST) of the computer system, and controls the data transmission unit to copy the first operating system data stored in the data storage unit to the main memory during the POST.

25 Claims, 4 Drawing Sheets

COMPUTER SYSTEM AND BOOTING METHOD THEREOF

CROSS-REFERENCE TO RELATED APPLICATION

This application claims priority from Korean Patent Application No. 2007-78790, filed in the Korean Intellectual Property Office on Aug. 6, 2007, the disclosure of which is incorporated herein by reference.

BACKGROUND OF THE INVENTION

1. Field of the Invention

Aspects of the present invention relate to a computer system and a booting method thereof, and more particularly, to a computer system which performs a power-on self test (POST) and loads an operating system, and a booting method thereof.

2. Description of the Related Art

A computer system, such as a desktop computer or a laptop computer, is turned on and then booted. During the booting process, the computer system loads an operating system to perform a normal operation. The operating system is loaded by copying data of the operating system (hereinafter referred to as operating system data) stored in a hard disc drive or a flash memory as a secondary memory unit to a main memory, such as a RAM (random access memory), accessed by a CPU (central processing unit).

In the conventional computer system, however, the operating system data is copied to the main memory only after an initialization sequence called a power-on self test (POST) is finished. The POST includes checking whether peripheral devices of the system operate normally, which takes quite some time. Thus, the operating system starts to be loaded only after the time required to perform the POST (hereinafter referred to as booting time) has elapsed. As a result, the booting process takes a long time to complete. Such delay of the start of the computer system due to the booting should be addressed in order to reduce the booting time.

SUMMARY OF THE INVENTION

Aspects of the present invention provide a computer system and a booting method thereof, which improve a POST sequence loading an operating system and reduce booting time.

According to an aspect of the present invention, a computer system is provided. The computer system includes a data storage unit to store first operating system data of the computer system; a main memory to which the first operating system data is copied; a data transmission unit to transmit data between the data storage unit and the main memory; and a controller to perform a power-on self test (POST) of the computer system, and to control the data transmission unit to copy the first operating system data stored in the data storage unit to the main memory during the POST.

According to another aspect of the present invention, the controller performs an operation based on the first operating system data copied to the main memory.

According to another aspect of the present invention, the controller performs an operation based on the first operating system data copied to the main memory when the copying of the first operating system data is finished.

According to another aspect of the present invention, the computer system further includes a flag storage unit to stores a flag to show whether the copying of the first operating system data is finished, wherein the controller determines whether the copying of the first operating system data is finished, based on the flag stored in the flag storage unit.

According to another aspect of the present invention, the data transmission unit transmits an interrupt to the controller if the copying of the first operating system data to the main memory is finished, and the controller sets a value of the flag stored in the flag storage unit if the interrupt is transmitted by the data transmission unit.

According to another aspect of the present invention, the controller determines the value of the flag stored in the flag storage unit if the POST is finished.

According to another aspect of the present invention, the computer system further includes a hard disc drive to store second operating system data of the computer system, wherein the controller controls the data transmission unit to copy the second operating system data stored in the hard disc drive to the main memory and performs an operation based on the second operating system data copied to the main memory if the copying of the first operating system data is not finished.

According to another aspect of the present invention, the computer system further includes a hard disc drive to store second operating system data of the computer system, wherein the controller controls the data transmission unit to copy the second operating system data stored in the hard disc drive to the main memory and performs an operation based on the second operating system data copied to the main memory.

According to another aspect of the present invention, the data storage unit may include a flash memory to store at least a part of the first operating system data therein.

According to another aspect of the present invention, a booting method of a computer system is provided. The booting method includes performing a power-on self test (POST) of the computer system; and copying first operating system data of the computer system stored in a data storage unit to a main memory during the POST.

According to another aspect of the present invention, the booting method further includes performing an operation based on the first operating system data copied to the main memory.

According to another aspect of the present invention, the booting method further includes determining whether the copying of the first operating system data is finished; and performing an operation may be based on the first operating system data copied to the main memory if the copying of the first operating system data is finished.

According to another aspect of the present invention, the determining of whether the copying of the first operating system data is finished includes checking a value of a flag showing whether the copying of the first operating system data is finished.

According to another aspect of the present invention, the copying of the first operating system data includes generating an interrupt if the copying of the first operating system data is finished, and setting a value of the flag if the interrupt is generated.

According to another aspect of the present invention, the checking of the value of the flag includes checking the value of the flag after the POST is finished.

According to another aspect of the present invention, the booting method further includes copying second operating system data of the computer system stored in a hard disc drive to the main memory if the copying of the first operating system data is not finished, and performing an operation based on the second operating system data copied to the main memory.

According to another aspect of the present invention, the booting method further includes copying second operating system data of the computer system stored in a hard disc drive to the main memory, and performing an operation based on the second operating system data copied to the main memory.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION OF THE EMBODIMENTS

Figure 1:
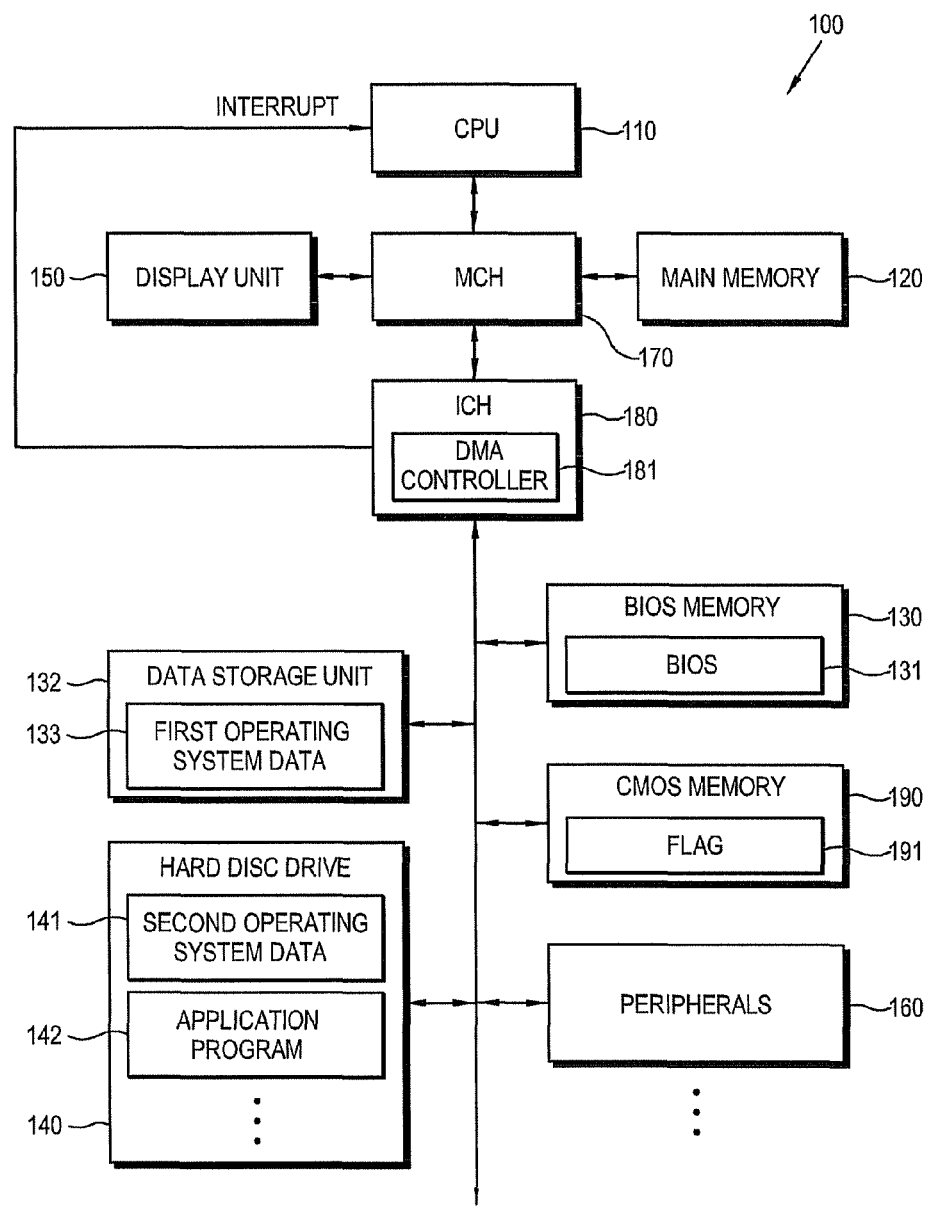
FIG. 1 is a block diagram of a computer system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a computer system 100 according to an embodiment of the present invention. The computer system 100 includes a CPU 110, a main memory 120, a BIOS (basic input/output system) memory 130, a data storage unit 132, a hard disc drive 140, a display unit 150, peripherals 160, an MCH (memory control hub) 170 and an ICH (I/O control hub) 180. According to other aspects of the present invention, the computer system 100 may include additional and/or different components. Similarly, two or more of the above components may be integrated into a single unit.

The CPU 110 controls overall operations of the computer system 100. The CPU 110 executes a code copied to the main memory 120 to perform an operation corresponding to the code. The CPU 110 performs an operation to control at least one of the data storage unit 132, the hard disc drive 140, the display unit 150, the peripherals 160, the MCH 170, and the ICH 180. The main memory 120 also stores data relating to performing the operation. The main memory 120 includes a volatile memory, e.g., a DDR-SDRAM (double-data-rate synchronous dynamic random access memory). While not required, the computer system 100 may be a desktop computer, a portable computer, a personal digital assistant (PDA), a personal entertainment device, or any device that utilizes an operating system.

The BIOS memory 130 stores a code of a BIOS 131. If the computer system 100 is turned on, the BIOS 131 is copied to the main memory 120 by the CPU 110 to initialize the computer system 100. The initialization of the computer system 100 includes a power-on self test (POST). The BIOS 131 allows the CPU 110 to copy the operating system data to the main memory 120 during the POST, in order to start the operating system of the computer system 100. The CPU 110 executing the BIOS 131 is an example of a controller according to some aspects of the present invention; however, this is not required in all aspects. The BIOS memory 130 is a non-volatile memory, such as, a ROM (read-only memory).

According to other aspects of the invention, the BIOS memory 130 may be a volatile memory.

The data storage unit 132 stores first operating system data 133 for the operating system. The hard disc drive 140 stores second operating system data 141 for the operating system. The first and second operating system data 133 and 141 include programs and data of the operating system. The operating system may include any operating system, such as Microsoft Windows, Linux, or Mac OS X.

The first and second operating system data 133 and 141 may be parts of the operating system data, and may be combined into the operating system. According to other embodiments, the first operating system data 133 may be a part of the second operating system data 141. In this case, the second operating system data 141 includes all of the operating system data. The CPU 110 performing an operation based on the first operation system data 133 and/or the second operating system data 141 may be an example of a controller according to some aspects of the present invention. The first operating system data 133 may be operating system data needed to start up the operating system, while the second operating system data 141 may be operating system data that is not necessary to start up the operating system. For example, printer drivers, which may not be necessary when starting the operating system, may be part of the second operating system data 141. The second operating system data 141 may also be substantially identical to the first operating system data 133, whereby the second operating system data 141 differs only by a time at which the second operating system data 141 was copied, as compared to when the first operating system data 133 was copied.

Figure 2:
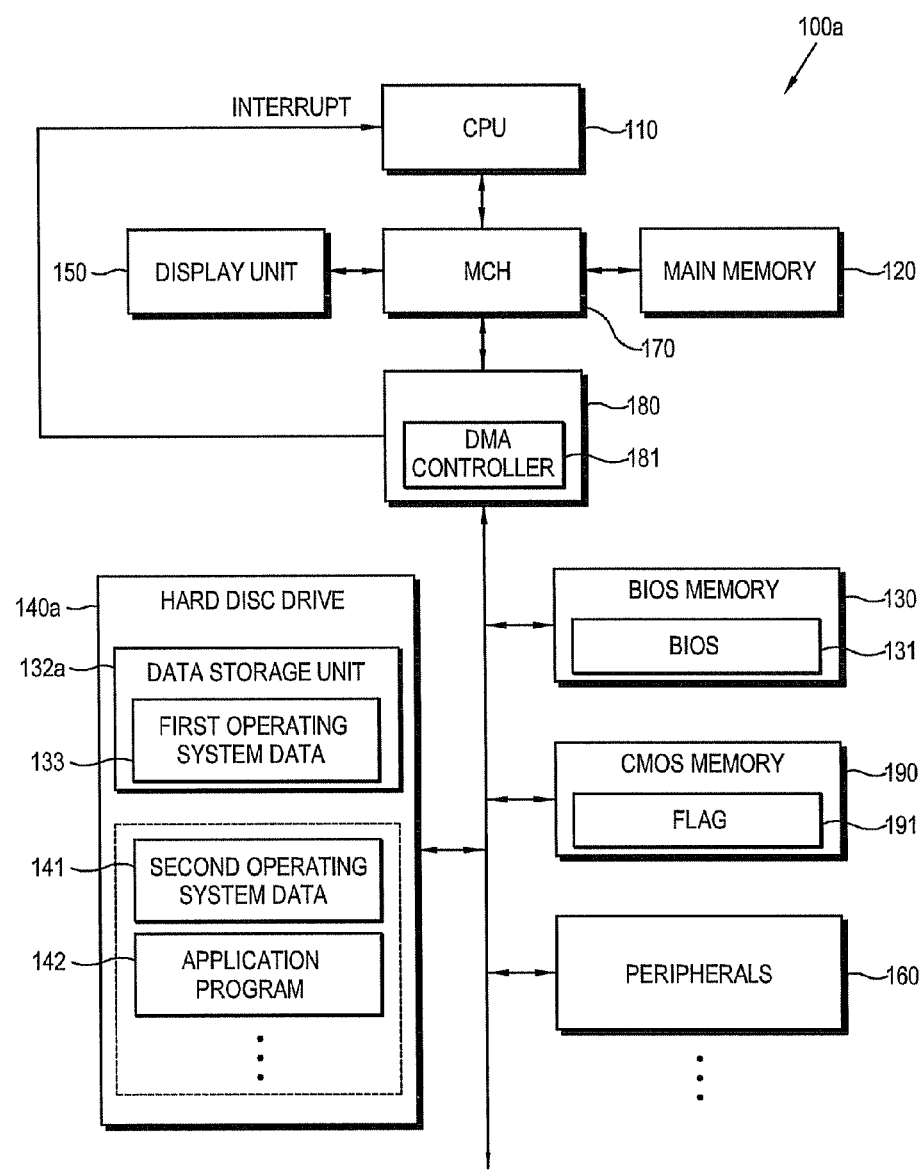
FIG. 2 is a block diagram of a computer system according to another embodiment of the present invention.

The data storage unit 132 may include a flash memory, i.e. a non-volatile memory. The data storage unit 132 may be provided in a mother board (not shown) in which the CPU 110 and the main memory 120 are mounted. According to another embodiment of the present invention shown in FIG. 2, a data storage unit 132a of a computer system 100a may be embedded in a hard disc drive 140a. If the data storage unit 132 includes a flash memory, the booting time may be further reduced and stability may improve, as compared to a magnetic disc.

The hard disc drive 140 may include a flash memory, a non-volatile memory, as well as a magnetic disc and/or an optical disc. The hard disc drive 140 stores an application program 142 therein to perform a particular function of the computer system 100. The hard disc drive may be detachable or internal to the computer system 100.

The display unit 150 displays the operation of the computer system 100 thereon. The display unit 150 may include a graphic processor, such as a graphics card, and a display module, such as an LCD (liquid crystal display) monitor. The display unit 150 may be detachable from the computer system 100.

The peripherals 160 are hardware that enable the computer system 100 to perform various functions. The peripherals 160 may include a keyboard, a mouse, a sound card, a speaker, a microphone, a CD drive, a DVD drive, a USB drive, a modem, a network card, etc.

As shown in FIG. 1, the MCH 170 and ICH 180 interface data communication between the CPU 110 and other devices. The MCH 170 provides high speed communication and the ICH 180 provides low speed communication. The MCH 170 and the ICH 180 may be integrally formed on the motherboard or be provided as additional chips.

The ICH 180 includes a direct memory access (DMA) controller 181. The DMA controller 181 may access data of the main memory 120 without support from the CPU 110.

The DMA controller 181 transmits data between the data storage unit 132 and the main memory 120 to copy the first operating system data 133 stored in the data storage unit 132 to the main memory 120. The DMA controller 181 is one example of a data transmission unit according to some aspects of the present invention.

Although described above as part of one system, according to other aspects of the invention, the various components of the computer system 100 need not be incorporated within one device. For example, the hard disc drive 140 or the data storage unit 132 could be located on a server machine accessible via a wired or wireless network.

Figure 3:
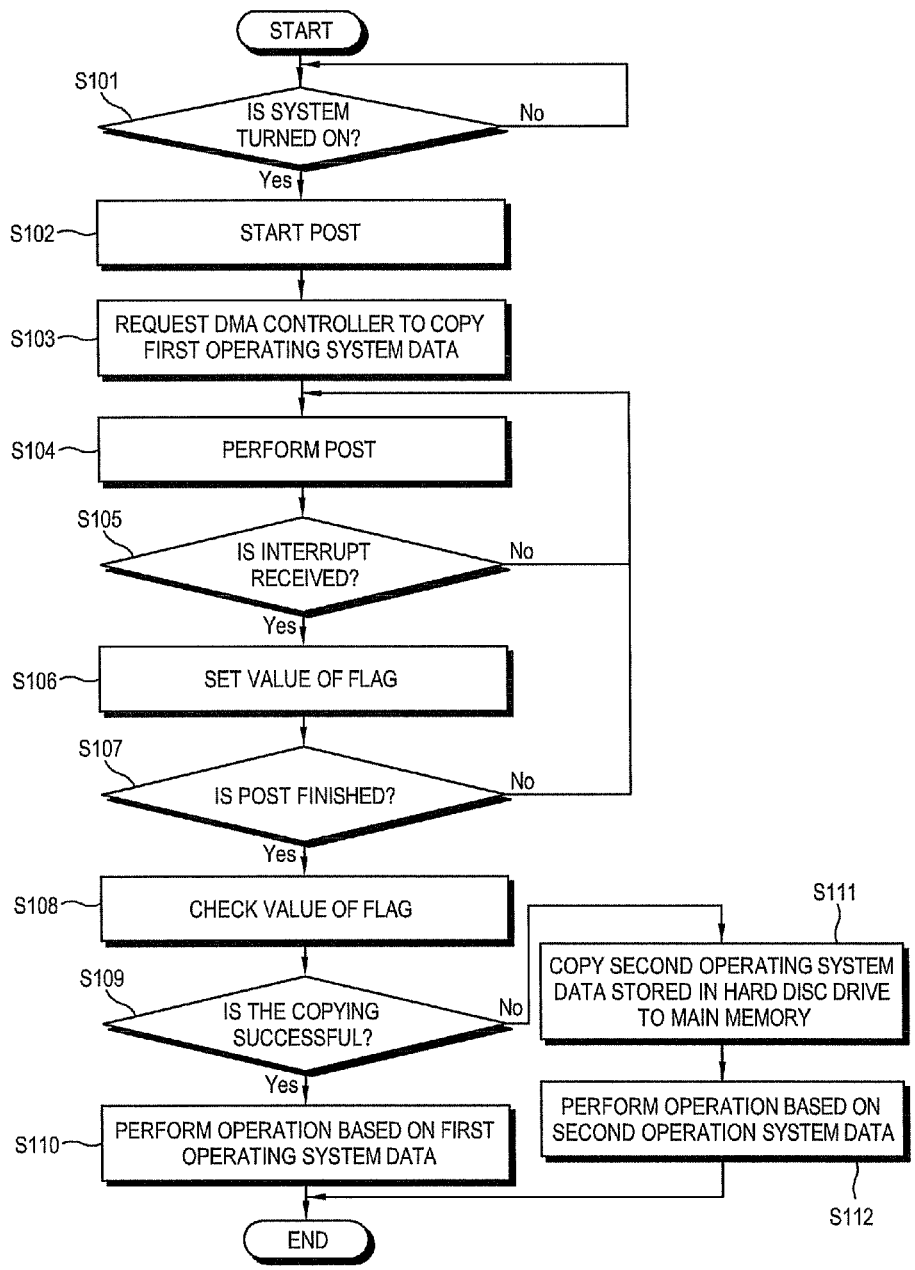
FIGS. 3 and 4 are flowcharts to describe a booting method of the computer system according to an embodiment of the present invention.
Figure 4:
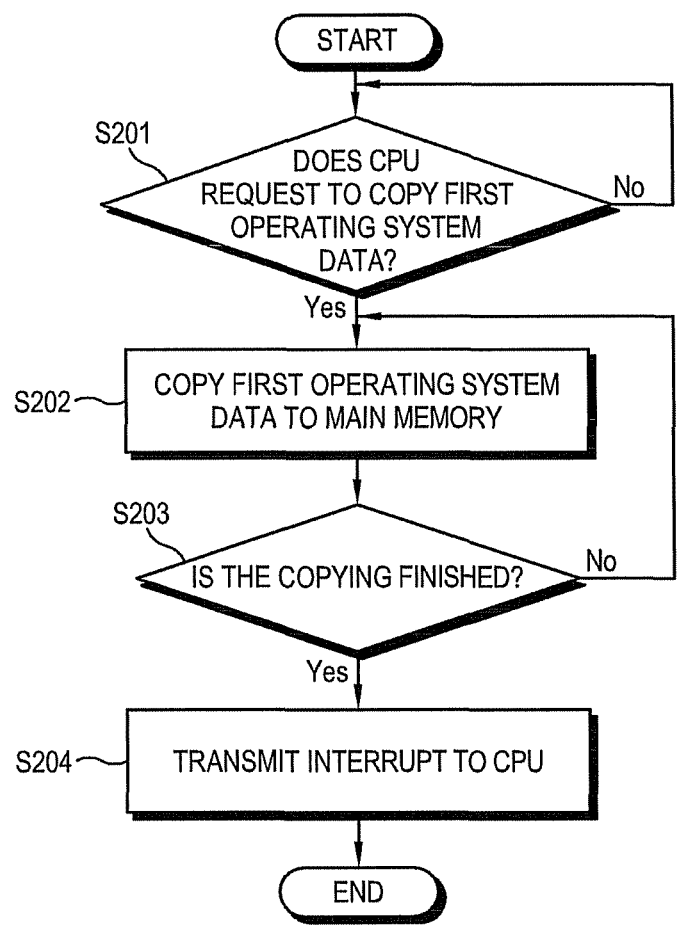

FIGS. 3 and 4 are flowcharts to describe a booting process of the computer system 100 according to an embodiment of the present invention. FIG. 3 illustrates the operation of the CPU 110, and FIG. 4 illustrates the operation of the DMA controller 181.

As shown in FIG. 3, if the computer system 100 is turned on at operation S101, the CPU 110 performs the POST using the BIOS 131 at operation S102. At operation S103, the CPU 110 requests the DMA controller 181 to copy the first operating system data 133 stored in the data storage unit 132 to the main memory 120. The request may be performed at any time during the POST of the operation S102. The request may be implemented at any time after all the devices relating to copying the first operating system data 133, such as the main memory 120 and the DMA controller 181, operate normally, but prior to determining if other devices are operating normally. At operation S104, the CPU 110 performs a subsequent POST task.

As shown in FIG. 4, the DMA controller 181 determines whether the CPU 110 has requested the copying of the first operation system data 133 at operation S201. If the CPU 110 has requested to copy the first operating system data 133, the DMA controller 181 transmits the data from the data storage unit 132 to the main memory 120 so that the first operating system data 133 stored in the data storage unit 132 is copied to the main memory 120 at operation S202.

At operation S203, the DMA controller 181 determines whether the copying of the first operating system data 133 to the main memory 120 is finished. If the copying of the first operating system data 133 is not finished, the DMA controller 181 continues to perform operation S202. If the copying of the first operating system data 133 is finished, the DMA controller 181 transmits an interrupt to the CPU 110 to report that the copying of the first operating system data 133 is finished at operation S204. Otherwise, the DMA controller 181 waits for the request from the CPU 110.

Returning to FIG. 3, at operation S105 the CPU 110 determines whether the interrupt reporting the completion of copying the first operating system data 133 is received from the DMA controller 181 during the POST. If the interrupt is not received from the DMA controller 181, the process returns to operation S104.

If the interrupt is received at operation S105, the CPU 110 sets a value of a flag 191 (shown in FIG. 1) to show that the copying of the first operating system data 133 to the main memory 120 is finished at operation S106. The flag 191 may be stored in a CMOS (complementary metal oxide semiconductor) memory 190 (shown in FIG. 1) of the computer system 100. The CMOS memory 190 is an example of a flag storage unit according to an aspect of the present invention. The flag 191 is one example of a way to indicate completion of the copying. Other ways to signal completion of the copying operation may also be employed without departing from the scope of the invention, such as storing a successful result indicator in a register of the CPU 110.

At operation S107, the CPU 110 determines whether the POST is finished. If the POST is not finished, the process returns to operation S104. If the POST is finished, the CPU 110 checks the value of the flag 191 stored in the CMOS memory 190 and determines whether the first operating system data 133 is copied to the main memory 120 at operation S108.

If the first operating system data 133 is copied to the main memory 120, the CPU 110 performs the operation of the operating system based on the first operating system data 133 copied to the main memory 120 at operation S110. The operating system starts at operation S110. After the operating system starts based on the first operating system data 133, the second operating system 141 including the remaining operating system data stored in the hard disc drive 140 may be copied to the main memory 120.

The first operating system data 133 is copied in advance to the main memory 120 during the POST. The operating system performs an operation based on the precopied first operating system data 133 after the POST, thereby minimizing the delay of the completion of the booting due to the POST and reducing the booting time.

If the first operating system data 133 is not copied to the main memory 120, the CPU 110 controls to copy the second operating system data 141 stored in the hard disc drive 140 to the main memory 120 at operation S111. At operation S112, the CPU 110 performs the operation of the operating system based on the second operating system data 141 copied to the main memory 120.

As described above, aspects of the present invention provide a computer system and a booting method thereof, which copies operating system data in advance to a main memory during a POST to minimize the booting completion delay due to the POST and reduces booting time.

Various components of the computer system 100 can be integrated into a single control unit, or alternatively, can be implemented in software or hardware, such as, for example, a field programmable gate array (FPGA) or an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A computer system comprising:
a data storage unit to store first operating system data of the computer system;
a hard disc drive to store second operating system data of the computer system;
a main memory to which the first operating system data is copied during a Power-On Self Test (POST) of the computer system;
a data transmission unit comprising a Direct Memory Access (DMA) controller, the DMA controller transmitting data from the data storage unit to the main memory so that the first operating system data stored in the data storage unit is copied to the main memory; and
a controller to perform the POST of the computer system, to request the DMA controller to copy the first operating system data stored in the data storage unit to the main memory during the POST, and to control the data transmission unit to copy the first operating system data stored in the data storage unit to the main memory in parallel while the POST is being performed in response to the request,
wherein the data storage unit comprises a flash memory provided in a mother board or embedded in the hard disc drive, and
wherein the DMA controller accesses data of the main memory without support from the controller.

2. The computer system according to claim 1, wherein the controller performs an operation based on the first operating system data copied to the main memory during the POST.

3. The computer system according to claim 2, wherein the controller controls the data transmission unit to copy the second operating system data stored in the hard disc drive to the main memory and performs an operation based on the second operating system data copied to the main memory.

4. The computer system according to claim 1, wherein the controller performs an operation based on the first operating system data copied to the main memory during the POST when the copying of the first operating system data is finished.

5. The computer system according to claim 4, further comprising:
a flag storage unit to store a flag showing whether the copying of the first operating system data is finished,
wherein the controller determines whether the copying of the first operating system data is finished based on the flag stored in the flag storage unit.

6. The computer system according to claim 5, wherein:
the data transmission unit transmits an interrupt to the controller if the copying of the first operating system data to the main memory is finished; and
the controller sets a value of the flag stored in the flag storage unit if the interrupt is transmitted by the data transmission unit.

7. The computer system according to claim 6, wherein the controller determines the value of the flag stored in the flag storage unit if the POST is finished.

8. The computer system according to claim 4, wherein the controller controls the data transmission unit to copy the second operating system data stored in the hard disc drive to the main memory and performs an operation based on the second operating system data copied to the main memory if the copying of the first operating system data is not finished.

9. The computer system according to claim 1, wherein the flash memory stores at least a part of the first operating system data therein.

10. A booting method of a computer system, the booting method comprising:
performing a power-on self test (POST) of the computer system;
requesting a Direct Memory Access (DMA) controller to copy a first operating system data stored in a data storage unit to a main memory during the POST; and
copying the first operating system data of the computer system stored in the data storage unit to the main memory by the DMA controller in parallel while the POST is being performed in response to the request,
wherein the data storage unit comprises a flash memory provided in a mother board or embedded in a hard disc drive, and
wherein the DMA controller accesses data of the main memory without support from a Central Processing Unit (CPU).

11. The booting method according to claim 10, further comprising performing an operation based on the first operating system data copied to the main memory.

12. The booting method according to claim 11, further comprising:
copying second operating system data of the computer system stored in the hard disc drive to the main memory; and
performing an operation based on the second operating system data copied to the main memory.

13. The booting method according to claim 10, further comprising:
determining whether the copying of the first operating system data is finished; and
performing an operation based on the first operating system data copied to the main memory if the copying of the first operating system data is finished.

14. The booting method according to claim 13, wherein the determining of whether the copying of the first operating system data is finished comprises checking a value of a flag showing whether the copying of the first operating system data is finished.

15. The booting method according to claim 14, wherein the copying of the first operating system data comprises:
generating an interrupt if the copying of the first operating system data is finished; and
setting a value of the flag if the interrupt is generated.

16. The booting method according to claim 15, wherein the checking of the value of the flag comprises checking the value of the flag after the POST is finished.

17. The booting method according to claim 13, further comprising:
copying second operating system data of the computer system stored in the hard disc drive to the main memory if the copying of the first operating system data is not finished; and
performing an operation based on the second operating system data copied to the main memory.

18. A computer system having a reduced booting time, comprising:
a main memory to store first operating system data upon booting the computer;
a Direct Memory Access (DMA) controller to transmit data from a data storage unit to the main memory so that the first operating system data stored in the data storage unit is copied to the main memory; and a controller to perform a Power-On Self Test (POST) when the computer system starts up, to request the DMA controller to copy the first operating system data stored in the data storage unit to the main memory during the POST, and to copy the first operating system data from the data storage unit to the main memory in parallel while the POST is being performed to reduce the booting time of the computer in response to the request, wherein the data storage unit comprises a flash memory provided in a mother board or embedded in a hard disc drive, and wherein the DMA controller accesses data of the main memory without support from the controller.

19. The computer system of claim 18, wherein the controller performs an operation based on the first operating system data copied to the main memory when the first operating system data is copied to the main memory.

20. The computer system of claim 19, further comprising:
a flag unit to store a flag indicating that the first operating system data has been copied to the main memory,
wherein the controller determines whether the first operating system data has been copied to the main memory based on the flag.

21. The computer system of claim 18, wherein the controller copies second operating system data stored on the hard drive to the main memory if the copying of the first operating system data to the main memory has not completed and the POST is completed.

22. The computer system of claim 18, further comprising:
a data transmission unit to copy the first operating system data from the data storage unit to the main memory,
wherein the controller controls the data transmission unit to copy the first operating system data to the main memory during the POST.

23. The computer system of claim 22, wherein the data transmission unit transmits a signal to the controller to indicate that the first operating system data has been copied to the main memory.

24. The computer system of claim 23, further comprising:
a flag unit to store a flag indicating that the first operating system data has been copied to the main memory,
wherein the data transmission unit sets the flag when the first operating system data has been copied to the main memory.

25. A Direct Memory Access (DMA) controller comprising circuitry configured to:
receive a command during a Power-On Self Test (POST) to request the DMA controller to copy a first operating system data stored in a data storage unit to a main memory;
copy the first operating system data from the data storage unit to the main memory in parallel while the POST is being performed; and
transmit an interrupt indicating that the first operating system has been copied to the main memory successfully,
wherein the data storage unit comprises a flash memory provided in a mother board or embedded in a hard disc drive, and
wherein the DMA controller accesses data of the main memory without support from a Central Processing Unit (CPU).

* * * * *